UNITED STATES PATENT OFFICE.

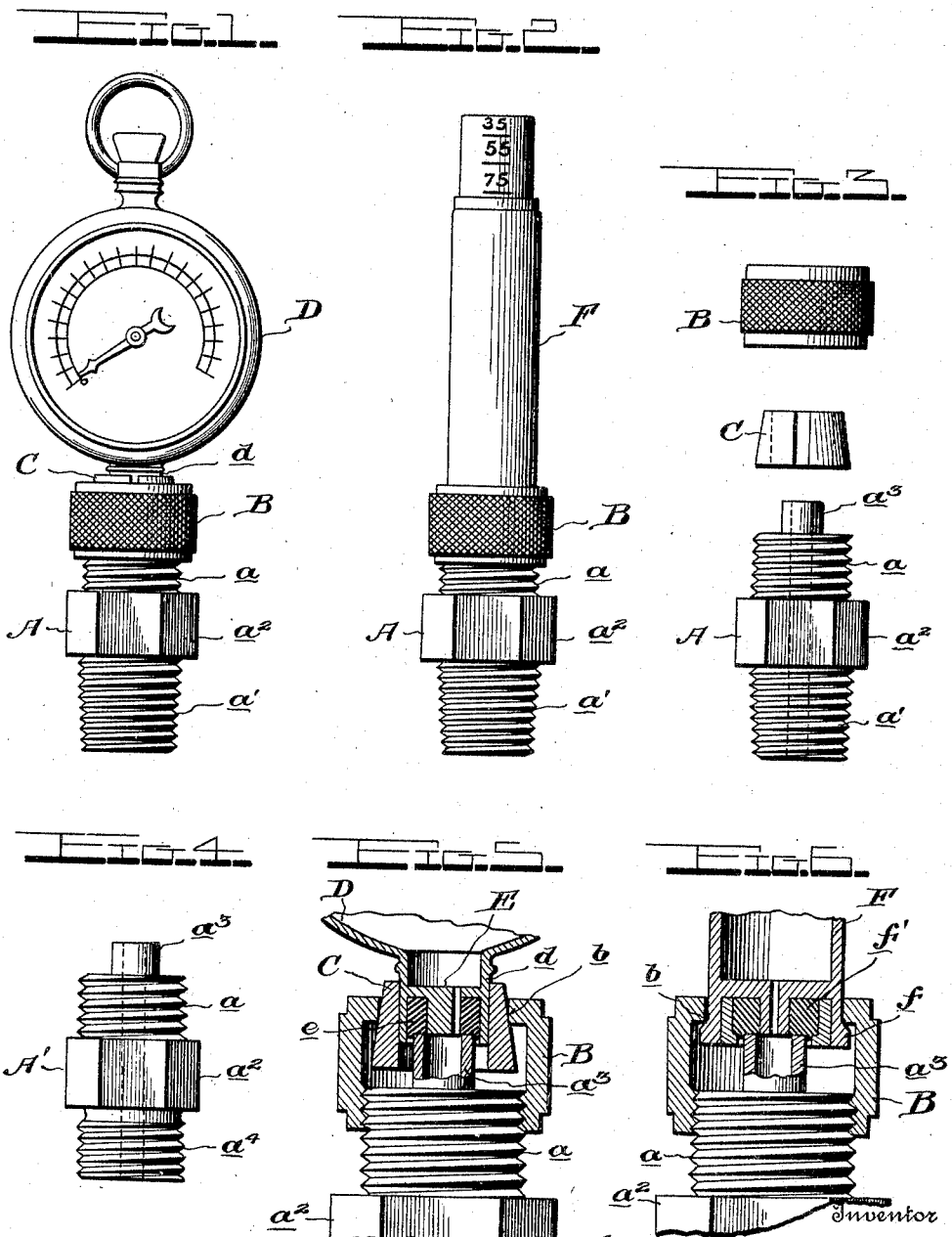

CHRISTIAN E. LOETZER AND CHARLES C. WEST, OF SAYRE, PENNSYLVANIA; SAID LOETZER ASSIGNOR TO SAID WEST.

GAGE-HOLDER FOR GASOLENE-ENGINES.

1,321,929.        Specification of Letters Patent.       Patented Nov. 18, 1919.

Application filed March 23, 1916. Serial No. 86,260.

*To all whom it may concern:*

Be it known that we, CHRISTIAN E. LOETZER and CHARLES C. WEST, citizens of the United States, residing at Sayre, in the county of Bradford and State of Pennsylvania, have invented certain new and useful Improvements in Gage-Holders for Gasolene-Engines; and we do hereby declare the following to be a full, clear, and exact description of the invention, such as will enable others skilled in the art to which it appertains to make and use the same.

This invention relates to devices for holding gages by means of which the compression in gasolene or other internal combustion engines may be registered and read, such as automobile engines composed of a multiplicity of cylinders in which satisfactory results are dependent upon the compression in all of the cylinders being uniform.

The primary object of our invention is to provide a simple, efficient and inexpensive device of the character referred to, which will permit the use of various types of tire gages now used for tire testing purposes in testing the compression of the cylinders of automobile and other internal combustion engines.

The invention will first be hereinafter more particularly described, with reference to the accompanying drawings, which form a part of this specification, and then pointed out in the claim at the end of the description.

In said drawings, Figure 1 is a side elevation of a gage holder embodying our invention and having mounted thereon a well known type of gage used in tire testing, the same being adapted for application to the cylinder of an automobile engine by removing the usual spark plug and screwing the gage holder in its place;

Fig. 2 is a side elevation of the same, illustrating the application of the device to another common type of gage used in tire testing;

Fig. 3 is a side elevation showing in separated relation the several parts of the gage holder shown in Fig. 1;

Fig. 4 is a side elevation of the gage holder slightly modified in form;

Fig. 5 is a detail sectional view, on a slightly enlarged scale, illustrating the method of securing the gage shown in Fig. 1 to our improved gage holder; and Fig. 6 is a similar view illustrating the method of securing to the holder the gage shown in Fig. 2.

Referring to said drawings, in which the same reference letters are used to denote corresponding parts in different views, the letter A may denote the gage holder which consists essentially of a tubular body having exteriorly threaded end-portions $a$ and $a^1$, and an intermediate multiple side or polygonal, preferably hexagonal, portion $a^2$, for applying a wrench, (the word polygonal being used to include a figure having two or more sides), together with an interiorly threaded nut or cap B, adapted to be screwed upon the pipe-end $a$ of said tubular body for securing a gage thereto, in the manner illustrated in Figs. 5 and 6 of the drawings. The part $a$ of the tubular body is formed or provided with a tubular projection $a^3$, which is preferably an integral reduced extension of said part and is used for a purpose hereinafter stated. The letter C denotes a tapered split bushing designed to be used with gages having necks or nipples of different diameters to be clamped to the holder, such, for example, as the gage shown in Fig. 1, wherein the neck $d$ of the gage D, as shown, is inserted in the split bushing C, which protrudes up through an opening in the top of the nut or cap B, and rests upon the projection $a^3$ (see Fig. 5); said neck having a partition and gasket seat E therein provided with a rubber gasket $e$ thereon seated upon said projection. By screwing the nut B down upon the threaded end $a$ of the holder the split bushing will be compressed so as to clamp the neck of the gage and firmly secure it to the holder, while the rubber gasket is drawn tightly down upon the projection so as to form an air-tight connection between the holder and gage. For holding a gage of the type shown in Fig. 2, the split bushing C is dispensed with, as the gage F is adapted to be inserted through the opening in the top of the nut or cap B, and has an annular exterior flange $f$ on its lower end underlying an annular interior shoulder or flange $b$ at the upper end of the nut B, so that when said gage is inserted the rubber gasket $f^1$ may rest upon the projection $a^3$, and will be drawn down tightly against said projection when the nut is screwed on, thereby firmly securing the parts together and forming an air-tight connection between the gage and holder, as described with reference to Figs. 1 and 5. The threaded end $a^1$ of the holder, in the form shown in Figs. 1 to 3, is ½ standard pipe size and tapered, which is used on engines of cars made by a number of standard automobile manufacturers. To adapt the device for use on automobile engines threaded to the S. A. E. also known as the A. L. A. M. standard or metric system for spark plug, the form shown in Fig. 4 is employed, having a threaded end $a^4$ of uniform diameter; otherwise such modification is substantially identical with the form shown in Figs. 1 to 3, and the operation is the same in both cases. For all other tire gages, (not shown) a split bushing similar to the bushing C may be used, differing therefrom merely in having a larger or smaller bore, to adapt it to other gages which differ in diameter. Sufficient space should be left between the projection $a^3$, and the bushing C to prevent the latter from touching the projection when it is compressed to clamp the neck or lower end of the gage, as shown in Fig. 5.

The utility and advantages of our improvement are obvious. It permits the use for testing the compression in the cylinders of automobile engines of any of the various types of gages now used for tire testing purposes, and avoids the annoyance incident to the present practice of guessing the amount of compression by turning the crank by hand for each cylinder and feeling the resistance or compression and noting if it feels alike for each cylinder, which method is very unsatisfactory and gives no definite results. By this method and the use of this gage holder a definite reading is obtained for each cylinder, which is accomplished in the following manner. After removal of the spark plug from one of the cylinders it is replaced by the gage holder, the gage is then mounted on the holder as above described and shown on drawing, after which the usual crank handle is turned over by hand, thus causing the amount of compression existing in that particular cylinder to be recorded on the gage. The operation is then repeated for each of the other cylinders in the same manner and preferably in consecutive order, thus producing an exact record or reading of the compression for each individual cylinder thereby indicating which one or more of the cylinders is deficient in compression, and also the exact degree of such deficiency, and the consequent loss of power taking place in same when in use. The readings and information thus obtained enable corrections or repairs to be made for the purpose of restoring the compression in the several cylinders to uniform and correct degree along intelligent lines, which is done by replacing the old piston or piston rings, either or both, or by regrinding or replacing the valve or valves, after which the tests may be repeated and the correction definitely affirmed and not guessed at, as is the case by the use of the former method.

Having thus described our invention, what we claim as new and desire to secure by Letters Patent of the United States is:

The combination with a gage of a gage holder consisting of a tubular body having exteriorly screw-threaded ends and an intermediate portion of polygonal form, the upper end of said body having a tubular projection thereon integral therewith, a nut screwed on said upper end inclosing said projection and having at its free upper end an inwardly extending annular flange, the neck of the gage being inserted through the opening in said nut and having a tapered split bushing thereon, said nut embracing said bushing so as to clamp the neck of the gage and draw it down on said projection.

In testimony whereof we affix our signatures in the presence of two witnesses.

CHRISTIAN E. LOETZER.
CHARLES C. WEST.

Witnesses:
W. L. TAYLOR,
M. E. WHITE.